(12) United States Patent
Yun et al.

(10) Patent No.: US 10,452,771 B1
(45) Date of Patent: Oct. 22, 2019

(54) AUTOMATIC QUOTE GENERATION

(71) Applicant: Amazon Technologies, Inc., Reno, NV (US)

(72) Inventors: Tiffany Yun, Seattle, WA (US); Tomer Moscovich, Seattle, WA (US)

(73) Assignee: Amazon Technologies, Inc., Reno, NV (US)

(*) Notice: Subject to any disclaimer, the term of this patent is extended or adjusted under 35 U.S.C. 154(b) by 333 days.

(21) Appl. No.: 15/018,225

(22) Filed: Feb. 8, 2016

Related U.S. Application Data

(63) Continuation of application No. 13/623,739, filed on Sep. 20, 2012, now Pat. No. 9,256,889.

(51) Int. Cl.
| | |
|---|---|
| *G06F 15/16* | (2006.01) |
| *G06Q 30/02* | (2012.01) |
| *G06F 17/30* | (2006.01) |
| *G06F 17/24* | (2006.01) |
| *G06F 17/25* | (2006.01) |
| *G06F 17/27* | (2006.01) |

(52) U.S. Cl.
CPC .......... *G06F 17/241* (2013.01); *G06F 17/25* (2013.01); *G06F 17/278* (2013.01)

(58) Field of Classification Search
CPC ....... G06F 17/25; G06F 17/241; G06F 17/278
USPC ........ 707/769, 802; 715/230, 231, 234, 240, 715/253
See application file for complete search history.

(56) References Cited

U.S. PATENT DOCUMENTS

| | | | |
|---|---|---|---|
| 8,725,838 B2 | 5/2014 | Bezos | |
| 8,868,558 B2* | 10/2014 | Blanco | G06F 16/9535 707/736 |
| 2008/0263451 A1* | 10/2008 | Portele | G06F 3/167 715/727 |
| 2011/0029620 A1* | 2/2011 | Bonforte | H04L 67/306 709/206 |
| 2011/0043652 A1 | 2/2011 | King et al. | |
| 2011/0202826 A1 | 8/2011 | Shimizu | |
| 2011/0289105 A1* | 11/2011 | Hershowitz | G06F 17/241 707/769 |

(Continued)

OTHER PUBLICATIONS

"Embedding Quotations"—Cassia Homann, San Jose State University, Jul. 2014 http://www.sjsu.edu/writingcenter/handouts/Embedding%20Quotations.pdf (Year: 2014).*

(Continued)

*Primary Examiner* — Randy A Scott
(74) *Attorney, Agent, or Firm* — Eversheds Sutherland (US) LLP

(57) ABSTRACT

Automatic quotes or references are generated based on a user's interaction with one or more pieces of content. A passage for quotation may be determined based at least in part on usage data including information about interaction with one or more pieces of content. A user may begin to type a quotation and a corresponding passage is inserted. The user may vary the scope of the passage, such as adding sentences or paragraphs. User annotation of the passage while the content is presented may also generate an automatically inserted quotation. A citation descriptive of the quoted passage may also be inserted. The automatically inserted quotation may be configured with a link or script, allowing additional functions or access to source content.

15 Claims, 12 Drawing Sheets

(56) References Cited

U.S. PATENT DOCUMENTS

2012/0311624 A1* 12/2012 Oskolkov .......... H04N 21/2541
　　　　　　　　　　　　　　　　　　　　725/25
2013/0159340 A1*　6/2013 Blanco .............. G06F 17/30867
　　　　　　　　　　　　　　　　　　　　707/769

OTHER PUBLICATIONS

Alper Koz, et al.—"Content Based Video Identification in Peer-to-Peer Networks: Requirements and a Novel Solution", IEEE, Apr. 20, 2010, 12 pp.

* cited by examiner

AUTOMATIC QUOTE GENERATION

CROSS-REFERENCE TO RELATED APPLICATIONS

This application is a continuation of U.S. patent application Ser. No. 13/623,739, titled "AUTOMATIC QUOTE GENERATION," filed Sep. 20, 2012, the contents of which are hereby incorporated by reference.

BACKGROUND

Students, scholars, lawyers, reporters, and many others frequently generate content in which other content is referenced or quoted. For example, research papers may reference various articles, legal briefs may reference cases, reporters may reference other reports, and so forth. Proper quotation and referencing can be tedious and error prone. Furthermore, due to the differences in formatting and management, citation of electronically delivered content may be more complicated.

Figure 1:
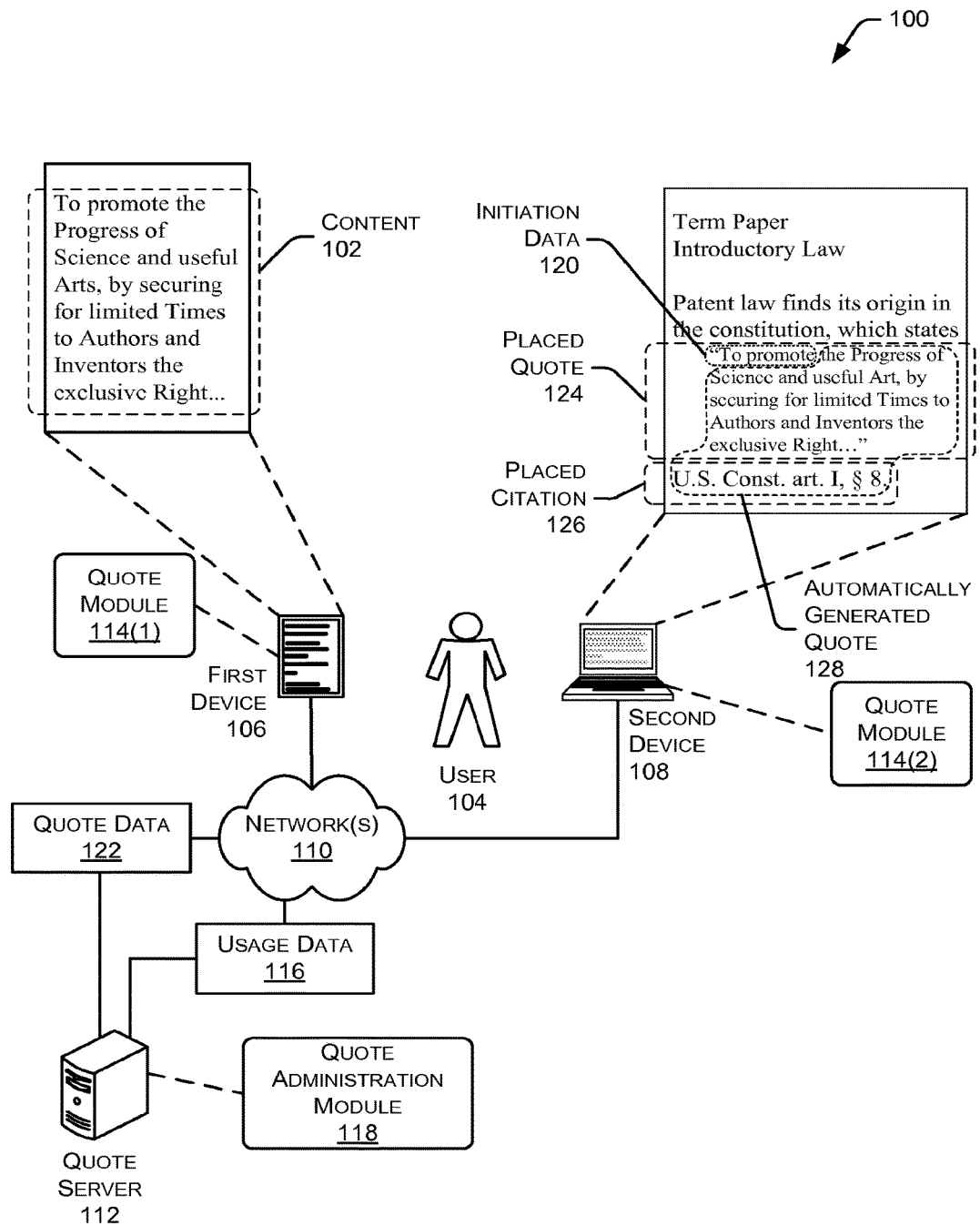
FIG. 1 illustrates a system for providing automatic quote generation of a passage from content presented on a first device and being quoted on a second device.

Certain implementations will now be described more fully below with reference to the accompanying drawings, in which various implementations and/or aspects are shown. However, various aspects may be implemented in many different forms and should not be construed as limited to the implementations set forth herein. Like numbers refer to like elements throughout.

DETAILED DESCRIPTION

A wide variety of content is available ranging from books, eBooks, magazines, articles, blogs, slide presentations, and so forth. Students, scholars, lawyers, reporters, and many others generate content in which other content is referenced or quoted. For example, a user typing an email may quote a particularly interesting passage in a book.

Traditionally quotation has required several steps, which may introduce errors. For example, the user may incorrectly enter the quoted passage, or may omit marks indicating the quote has been amended. Or the user may create an incorrect citation, such as omitting a part of the reference or using an incorrect label for the source content. Incorrect or inadequate citation may more likely when electronic versions of content are considered. For example, different electronic versions may be available, and may be presented on different devices.

Described in this disclosure are systems and methods for automatically generating quotes, quotes with citations, or citations. In one implementation, the user may have a first device such as an eBook reader device and a second device such as a laptop computer. The user may read and annotate content with the eBook reader device, while generating content using the laptop. For example, the user may read materials for an introductory law college class on the eBook reader device and may write a term paper for that class on their laptop. While reading the materials, usage data may be collected. The usage data provides information about what content or portions thereof have been presented to the user.

While writing the term paper, the user begins to enter a quote. A start of the quote is determined, such as by the user entering a hotkey, activating a command, entry of a particular gesture, typing a specific string such as a double quotation mark, and so forth. The usage data is used to determine what content is referenced and the passage therein. For example, rather than searching through all eBooks owned by the user, based at least in part on the usage data, the most recently accessed eBooks are searched. Based on the determination, the passage or a portion thereof is automatically inserted at the point where the user began to enter the quote.

The user may enter additional commands to select a particular portion of the content for quotation. For example, the user may press the right arrow key to select the next sentence in the passage, down arrow to select an entire paragraph, and so forth. Upon entry of a closed quote or other concluding string or command, a placed quote is completed and a placed citation referencing the passage may be generated and inserted as well. The placed quotes may include embedded information such as metadata, links to source content, and so forth.

The placed quotes may also be subject to one or more quote restrictions. For example, a publisher may specify that no more than ten percent of the publication is to be quoted in a single document, or by a particular user.

Quotes may also be automatically generated based on the user annotating a portion of the content. For example, when the user highlights a passage on the eBook reader device, a quote may be generated and presented on the laptop.

The automatic quote generation allows for the fast, easy, attributed, and accurate inclusion of portions of content in the user's work. As a result, the experience of the user generating the content is improved. Furthermore, the experience of a reader or consumer of the generated content is improved by the quality of the placed quote, the placed citation, and the ability to access functions such as links, metadata, and so forth which may be embedded in the placed quote as well.

Illustrative System

FIG. 1 illustrates a system 100 for providing automatic quote generation of a passage from content 102. The content 102 may include electronic books, printed books, journals, magazines, blogs, charts, graphs, presentations, email, user-generated files such as documents, and so forth. Each piece of content 102 may be arranged in passages or subsections, such as a sentence, paragraph, page, chapter, track, illustration, and so forth. A user 104 may be using one or more devices to work with the content 102. In this example, a first device 106 and a second device 108 are depicted. In one implementation, the first device 106 may be an electronic book ("eBook") reader device while the second device 108 may be a device with additional or more extensive features and capabilities. The first device 106 may be configured with a reflective screen, and may be designed primary for consumption of content. For example, the eBook reader device may be configured to present the eBook and accept annotations such as highlights, comments, bookmarks, and so forth. In comparison, the second device 108 may have greater resources such as processor capability and available memory compared to the first device 106.

In some implementations the first device 106 and the second device 108 may have the same or identical resources. For example, the first device 106 and the second device 108 may both comprise tablet computers of the same make and model. In yet another implementation, presentation of the content and the work being done which may quote the content may be performed on the same physical device or on the same virtual device. For example, a single tablet computer may display an eBook reader application as well as a word processing application. The first device 106 and the second device 108 are discussed in more detail below with regard to FIG. 6.

The first device 106 and the second device 108 may couple to a network 110. The network 110 may include, but is not limited to, the Internet, a private network, a virtual private network, a wireless wide area network, a cellular data network, a local area network, a personal area network, a wireless local area network, metropolitan area network, a telephone network, and so forth. When coupled to the network 110, the first device 106 and the second device 108 may communicate with each other, or with other devices coupled to the network 110. A quote server 112 configured to provide automatic quote generation may be coupled to the network 110. The quote server 112 may be configured to work in conjunction with one or both of the first device 106 and the second device 108 as described next to automatically generate quotes.

The first device 106 and the second device 108 may each include a quote module 114. The quote module 114 is configured to automatically facilitate quotation of a portion of the content 102. In one implementation, the quote module 114 may be configured to gather or access usage data 116 for the device. The usage data 116 describes how the user 104 is interacting with content 102 on the device, or the state of the device. For example, usage data 116 may include information such as what piece of content 102 is presently displayed on the first device 104. The usage data 116 is discussed below in more detail with regard to FIG. 2.

The quote server 112 may include a quote administration module 118. The quote administration module 118 may be configured to enforce quote restrictions, determine quotes, distribute quotes, and so forth. The quote administration module 118 may work in conjunction with one or more of the quote modules 114 to automatically generate quotes. In some implementations the quote administration module 118, or the associated functionality, may be executed at least in part on the first device 106, the second device 108, or both.

Based at least in part on the usage data 116, the quote module 114, the quote administration module 118, or both, are configured to determine a portion of the content 102 and generate a placed quote 124. In one implementation, to make this determination the quote module 114 may receive through a user interface or acquire from another device an initiation data 120. The initiation data 120 triggers the quote module 114 to begin searching the content 102 for a portion to use in a quote. In some implementations an initiation event may trigger the quote module 114 to begin searching using the initiation data 120. The initiation data 120 may be received in some implementations from a user interface configured to edit or create a file. For example, the user interface may be part of a word processor.

This search may be of one or more of the content 102, user annotations, user comments, and so forth. The initiation data 120 may comprise text or other input such as recognized speech, sign language, drawings, and so forth which corresponds to at least a portion of one or more of the content 102, user comments associated with the content 102, or annotations associated with the content 102.

The initiation data 120 may include a string beginning with the double-quote character. For example, the quote module 114 may be configured to search the content 102 for the text following a single double-quote character, or which appears within a pair of double-quotes. When a user interface receives a first single double-quote, an initiation event may be generated indicating that the initiation data 120 is to comprise the subsequently entered data.

In another implementation, ongoing portions of text or other data entered by the user 104 may be used as the initiation data 120. For example, while the user 104 enters text into a document on the second device 108, the quote module 114(2) may check the entered text for matches in the content 102 or the comments or annotations of the content 102.

A user interface may be configured to receive the initiation data 120 from user input. For example, a dialog box may be presented for the initiation data 120. Other mechanisms such as onscreen controls, hotkeys, particular gestures, and so forth may also be used to indicate the insertion of a quote is desired by the user 104.

The quote module 114 may be configured to apply spell checking, machine learning, heuristics, and so forth to determine a portion of the content 102 for quotation where the user 104 has incorrectly entered a quote. For example, the initiation data 120 may be incorrectly entered as "To prorate" which the quote module 114 in conjunction with the quote administration module 118 determines the user likely intended to enter "To promote" based at least in part on the usage data 116 and the data in the currently presented content 102.

In this implementation, based at least in part on the usage data 116 and the initiation data 120, the quote module 114, the quote administration module 118, or both working in conjunction generate quote data 122. The quote data 122 provides information about a portion of the content 102 which the user 104 would like to quote. The quote data 122 may include information such as the text of the quoted content 102, citation data, and so forth. The quote data 122 is discussed in more detail below with regard to FIG. 3.

The quote module 114 may process the quote data 122 and present a portion of the quoted content 102 to the user 104 with a user interface. The user 104 may use the user interface to select a scope of the quote. The scope of the quote designates boundaries of the portion of the content 102 the user 104 wishes to quote. Thus, the user 104 may expand or reduce the quoted material to get a particular desired quote. For example, the user 104 may use a right arrow key to select an entire sentence, a down arrow key to select an entire paragraph, and so forth. When the user 104 determines the scope of the quote, or accepts the default scope, the quote module 114 generates, based on the quote data 122, a placed quote 124.

The placed quote 124 may be inserted by the quote module 114 into an existing piece of content, such as a document or email of the user 104. The placed quote 124 may include links, embedded data, digital rights management parameters, and so forth. For example, the placed quote 124 may include links such that, when processed, present the content 102 from which the quote was taken. Continuing the example, when the user 104 is reading the document on the second device 108 and selects the placed quote 124, the embedded link may result in the content 102 being presented on the first device 106 at the point where the quoted material appears.

The user 104 may choose to edit the placed quote 124. For example, the user 104 may remove a portion in the middle of the quoted material, insert a clarifying comment, and so forth. These user edits may be accepted and in some implementations the quote module 114 may automatically add editing marks indicative of the user edits. For example, insertion of text may be enclosed in square brackets, deletion of text indicated with ellipses, and so forth. Also, the entirety of the originally quoted material unedited by the user 104 may still be available for presentation. For example, upon later presentation of the quoted material, the user 104 may be able to select and view the original quote without the editing.

The quote module 114 may also be configured to insert a placed citation 126. The placed citation 126 may comprise a human-readable citation format referring to the content 102. In some implementations, the placed citation 126 may be configured to be dynamic, such that as the content 102 is updated, the presentation of the placed citation 126 is changed to match. The placed quote 124 and the placed citation 126 may be collectively referred to as an automatically generated quote 128. For example, as depicted here and described above, the initiation data 120 of "To promote" resulted in the quote of a portion of the United States Constitution. The user 104 defined the scope of the quote, and the placed citation 126 appropriate to the placed quote 124 was automatically inserted without human intervention.

The system 100 may also be configured to automatically format and amend the automatically generated quote 128. For example, the user 104 may insert a word, or choose to end the quote before the end of a sentence. The quote module 114, the quote administration module 118, or both may be configured to automatically bracket added words, insert ellipses, and so forth. This functionality may improve the overall integrity of the quote by minimizing editing errors.

Annotation, or review of annotations, may be used to initiate the generation of the automatically generated quote 128. This may be used instead of, or in addition to, the initiation data 120 described above. The content 102 may be annotated. These annotations may include a comment associated with a portion of the content 102, a highlight made to a portion of the content, a bookmark entry, and so forth. The system 100 may be configured to generate the automatically generated quote 128 based on the action of annotating the content 102, selecting an annotation, and so forth. For example, when the user 104 highlights a portion of text in the content 102 on the first device 106, the quote module 114 may insert the automatically generated quote 128 into user-generated content on the second device 108, such as a document open in a word processing application. The user-generated content may comprise data which was created at least in part by the user 104. Generation of the automatically generated quote 128 based on an annotation is discussed in more detail below with regard to FIGS. 10 and 11.

In some implementations the quote modules 114(1), 114(2), . . . , 114(Q) may be configured to operate in a collaborative display mode, where the content or quote presented on one device affects one or more other devices. For example, while scrolling through the document containing the automatically generated quote 128 on the second device 108, the first device 106 may be configured to present the portion of the content 102 which is quoted. Similarly, while paging through the content on 102 the first device 106, the second device 108 may be configured to present the portion of the user-generated document containing the automatically generated quote 128 which corresponds to the portion on the display of the first device 106.

The quote modules 114(1) and 114(2), working in conjunction with one another and the quote administration module 118 provide a user-friendly environment in which the user 104 may easily and accurately quote material. As described above, this may include quoting content 102 which the user 104 has generated. For example, the user 104 may use the quote module 114 to enter an automatically generated quote 128 referring to an email sent several weeks ago. A portion of the email may be inserted as the placed quote 124 and the placed citation 126 may indicate the information about the particular email in which the quote appears.

While two devices (106 and 108) and one server (112) are depicted in this illustration, in other implementations additional devices or servers may be involved. For example, the user 104 may have a third device comprising another eBook reader device. The first device 106 may present a first piece of content 102(1) while the third device presents another piece of content 102(2) or a different portion of the content 102(1).

Figure 2:
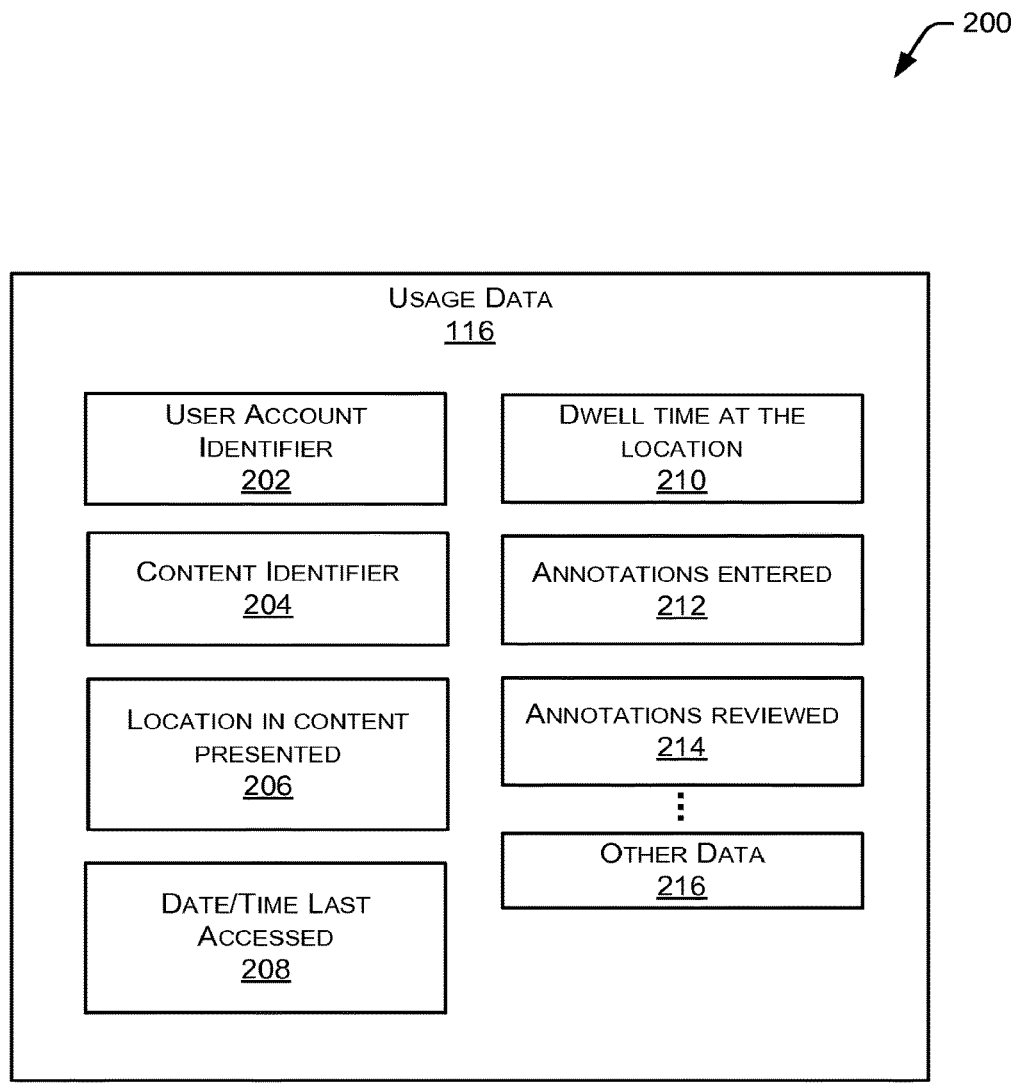
FIG. 2 illustrates a block diagram of the usage data which may be used to determine the passage to quote.

FIG. 2 illustrates a block diagram 200 of the usage data 116. The quote module(s) 114, the quote administration module 118, or a combination may determine the passage in the content 102 to include in the automatically generated quote 128 based at least in part on the usage data 116. The usage data 116 describes how the user 104 is interacting with content on the devices, the state of the devices, and so forth. The devices may be the first device 106, the second device 108, or both.

The usage data 116 may include a user account identifier 202. The user account identifier 202 provides information as to what user 104 is accessing the device and the content 102. For example, the user account identifier 202 may be used by the quote administration module 118 to limit a search of content 102 to that which the user 104 has associated with their account.

A content identifier 204 provides information about what particular piece of content 102 the usage data 116 is associated with. For example, the content identifier 204 may indicate that the United States Constitution was being accessed.

A location in content presented 206 may be provided in the usage data 116. This may be a location identifier specifying the last known location, or last known set of locations of the content 102 which the user 104 had presented. For example, the location in a physical book may be a page number, or in an eBook may comprise an invariant reference number, byte count, embedded markup tag, and so forth. This may be the location in the content presented 206 at a given instant in time, such as at the time of an initiation event, or the location in the content 102 at a previous time.

A date/time last accessed 208 may be provided. The system 100 may be configured to search for quotes across many pieces of the content 102 in order of the date/time last accessed 208. For example, recently accessed content 102 may be searched first, while content 102 which has not been accessed for several months may be searched last.

A dwell time at the location 210 in the content 102 may be provided in the usage data 116. For example, the dwell time may indicate how long the portion of the content 102 was presented to the user, either at a single time or cumulatively. The system 100 may be configured to determine the search order of the content 102 as well as ranking potentially ambiguous results based at least in part on the dwell time at the location 210. For example, the initiation data 120 may return several results. A result for a particular passage in the content 102 which the user spent twelve minutes reading would be listed first, while the remaining results with lesser dwell times would be listed later.

The usage data 116 may reflect annotations entered 212 or annotations reviewed 214. Annotations may include the user 104 inserting a comment associated with a portion of the content 102, highlighting a portion of the content 102, entering a bookmark, and so forth. An annotation may be considered an indicator that the user 104 is particularly interested in this portion of the content 102. In some implementations, the system 100 may be configured to search the annotations and associated portions of content 102 for the initiation data 120. When the annotation contains the text in the initiation data 120, the annotation, the associated portion of the content 102, or both, may be inserted as the automatically generated quote 128. The annotation entered 212 or annotations reviewed 214 data may include one or more location identifiers specifying a position of the annotated portion within the content 102.

In other implementations as described above, the annotation action or the review of the annotation may be used to generate the automatically generated quote 128. For example, the quote module 114(2) may receive usage data 116 from the quote module 114(1) indicating the user 104 has highlighted a passage. The quote module 114(2) may provide the automatically generated quote 128 on the second device 108 based at least in part on this quote data 122 indicating the highlight.

The usage data 116 may include other data 216, such as type of device the content 104 was accessed on, geographic location, and so forth. For example, the quote administration module 118 may be configured to provide automatically generated quotes 128 so long as the first device 106 and the second device 108 are on a particular college campus. Should the user 104 take the devices off campus, this functionality may be suspended.

The usage data 116 may also be manually entered, or transferred from another system. For example, the user 104 may be taking a class which uses a reference available in printed form and electronic form. The user 104 may not have access to the first device 106, but is using the second device 108 to write a term paper in conjunction with a printed copy of the reference. Using a user interface the user 104 may enter content identifiers 204 such as an international standard book number ("ISBN"), a universal product code ("UPC"), or a title of published material. The user 104 enters the ISBN of the paper book, and the system 100 may now access the electronic version of that title to provide the automatically generated quote 128.

Figure 3:
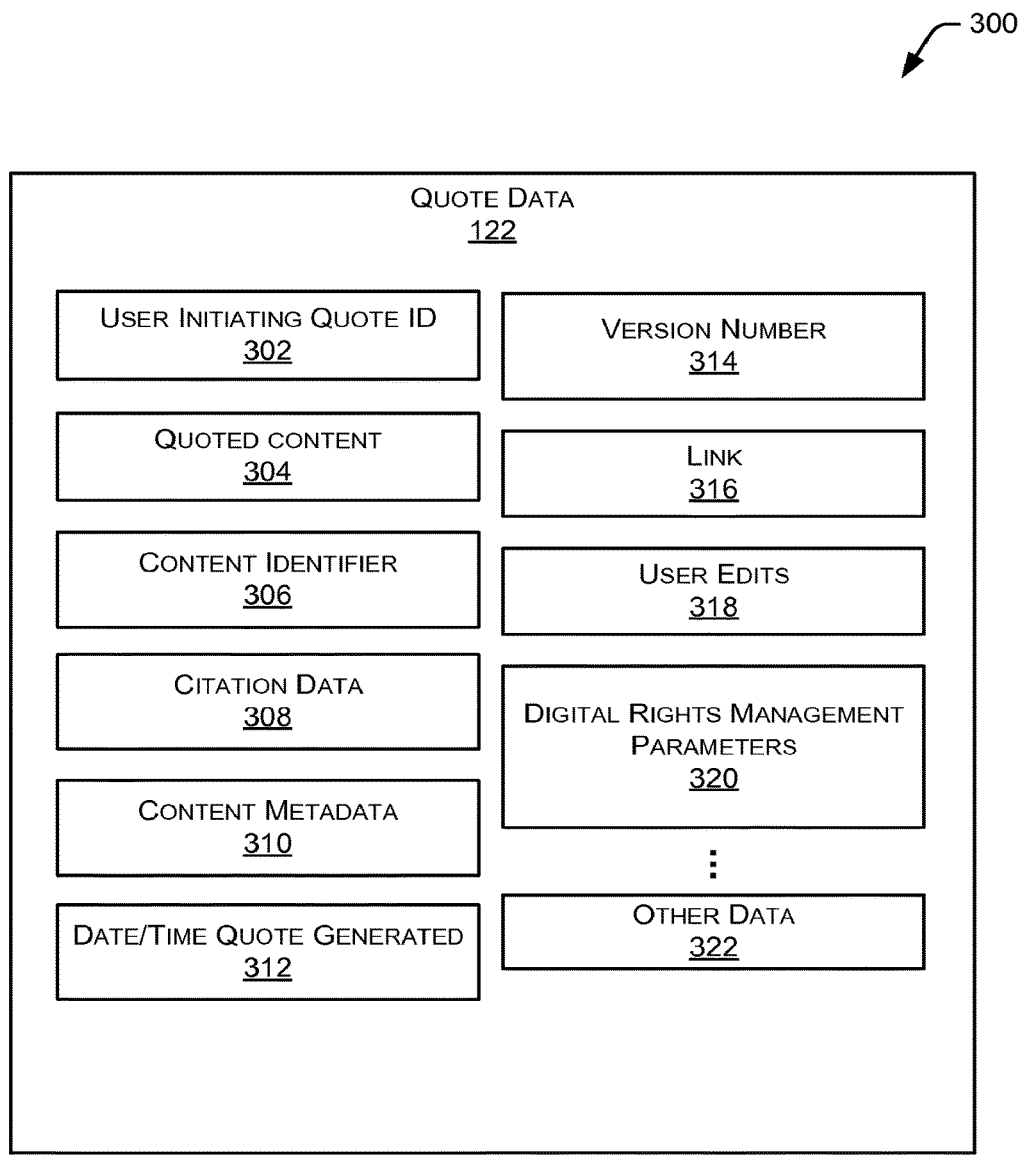
FIG. 3 illustrates a block diagram of the quote data which describes the quoted passage.

FIG. 3 illustrates a block diagram 300 of the quote data 122 which described the quoted passage in the automatically generated quote 128. A user initiating quote identifier 302 provides data about who has requested the quote. For example the user initiating quote identifier 302 allows for distinguishing the user 104 who entered the initiation data 120 from a different user 104(2) who has annotated the content 102, and so forth. The quote data 122 in the automatically generated quote 128 may thus provide traceability as to who quoted what.

Quoted content 304 is the particular text, diagram, figure, table, and so forth which the user 104 selected or indicated for quotation. A content identifier 306 identifies a particular piece of content 102. Citation data 308 may be included in the quote data 122. The citation data 308 may include bibliographic information such as author, references to physical print version, and so forth. Content metadata 310 may include information such as categories to which the content 102 belongs, copyright dates, and so forth. A version number 314 may be provided to allow for distinction between different editions or versions of the same piece of content 102. A date/time the quote was generated 312 may also be stored.

The quote data 122 may include a link 316. The link 316 may comprise a markup language tag, script, and so forth. The link 316 may include a reference such as a uniform resource locator to content stored on another device. The link 316 is configured such that when processed or rendered by the quote module 114 or another module such as a hypertext markup language rendering engine, an action is performed. For example, this action may be triggering presentation of the references portion of the content 102 on the first device 106 upon selection of the automatically generated quote 128. The link 316 may also be used to provide for checking, such that when the underlying content 102 changes, the automatically generated quote 126 may be updated. For example, the author of the content 102 may correct a typographical error which appears in the portion of the content which was quoted. After the correction, the quote module 114(2), after processing the link 316, may update the placed quote 124 to reflect the change in the underlying content 102.

The quote data 122 may also include user edits 318 made to the quote. For example, the user 104 may remove portions of the text, add words or suffixes for clarify, and so forth. The quote data 122 may include data about these edits. In some implementations, the underlying quoted content 304 may remain within the embedded automatically generated quote 128. As a result, the placed quote 124 may reflect the user edits 318, but the user 104 may activate the link 316 or use another facility to view the unedited quoted content 304.

Digital rights management parameters 320 may be provided in the quote data 122. These parameters 320 may be used to define limitations on distribution, what devices may be used to initiate automatically generated quotes 128, and so forth.

Other data 322 may also be provided. For example, a user entered category, a user entered rating of the quote, and so forth.

Figure 4:
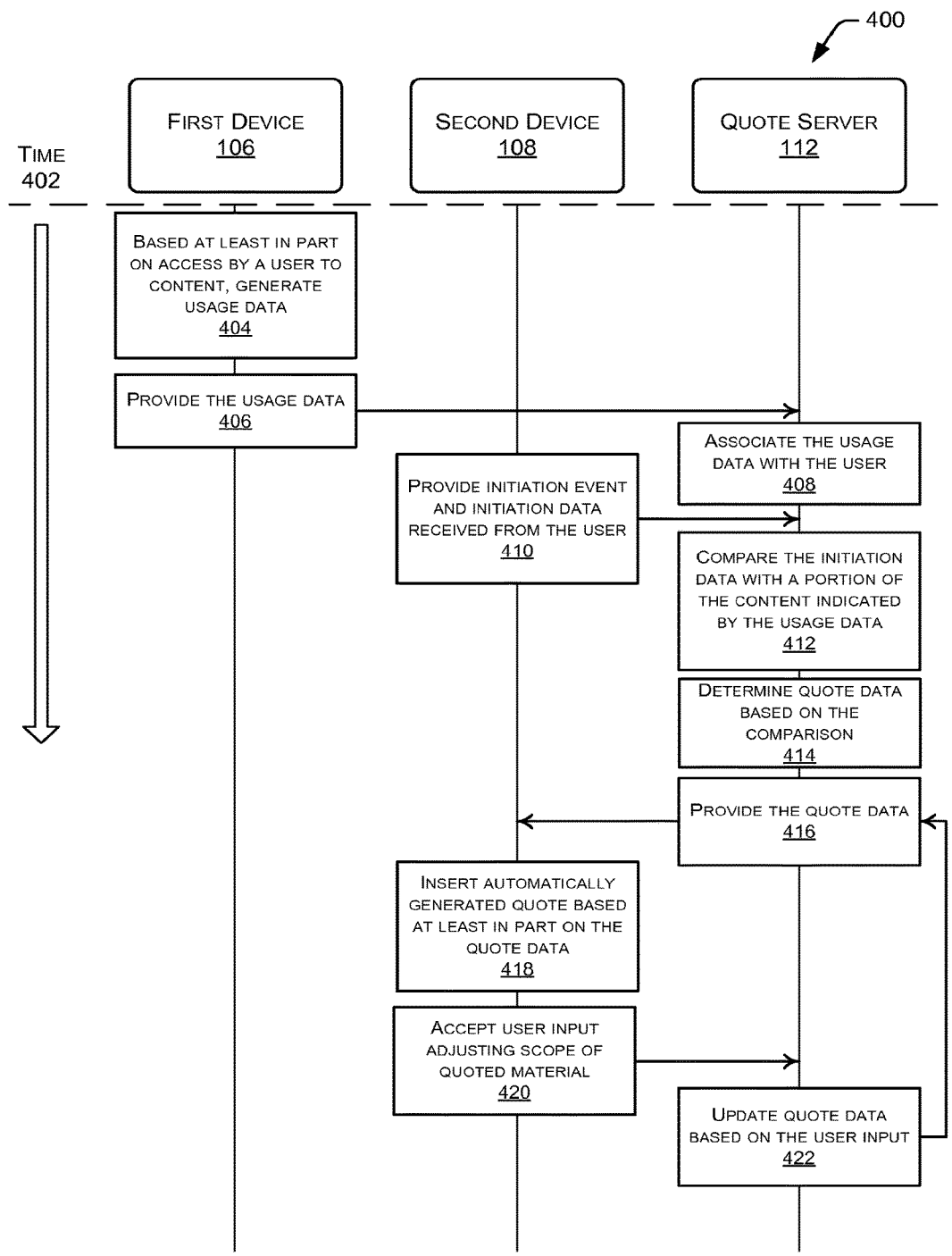
FIG. 4 illustrates a flow diagram of automatic generation of a quote in which at least a portion of the usage data is transferred to a quote server for determination of the quote.

FIG. 4 illustrates a flow diagram 400 of automatic generation of a quote in which at least a portion of the usage data 116 is transferred to the quote server 112 for determination of the quote. This diagram depicts the first device 106, the second device 108, and the quote server 112. Time is indicated with arrow 402, with time increasing down the page. For example, events at the top of the page may occur before events at the bottom of the page.

Based at least in part on access by the user 104 to content 102, block 404 generates usage data 116. For example, the user 104 may open the content 102 on the first device 106.

Block 406 provides the usage data 116 to the quote server 112. For example, the first device 106 may use a network interface to send the usage data 116 over the network 110 to the quote server 112.

Block 408 associates the usage data 116 with the user 104. For example, the quote server 112 may retrieve the user account identifier 202 from the usage data 116 and identify an account on the quote server 112 associated with that user.

Block 410 provides an initiation data 120 received from the user 104, such as through a user interface. As shown here, the user 104 has entered the initiation data 120 "To promote" on the second device 108. In another implementation, the initiation data 120 may be a portion of a user comment which is associated with the content 102. The second device 108 may send the initiation data 120, or a portion thereof, to the quote server 112. As described above, in some implementations the initiation data 120 may comprise ongoing entry of data, such that as the user 106 enters text, the process 400 checks for quotes and inserts automatically generated quotes 128.

In some implementations block 410 may provide data associated with initiation event in addition to the initiation data 120. The initiation event comprises one or more actions taken by the user 104 to initiating the generation of the automatically generated quote 128. For example, the initiation event may be used to trigger the providing of the initiation data 120 to the quote server 122 of block 410.

The initiation event may comprise entry of a particular key combination, use of a dedicated key, selection of text, change in focus in a user interface, entry of a particular string, and so forth. For example, the initiation event may be generated or triggered upon receive in a user interface of a single double-quote character. The initiation event may be configured to trigger the quote module 114 to act on the initiation data 120 data. In some implementations, the initiation event may trigger sending the initiation data 120 to the quote module 114. In another implementation, the quote module 114 may continuously monitor for the initiation data 120, without need for receiving a particular initiation event.

Block 412 compares the received initiation data 120 with a portion of the content 102 indicated by the content identifier in the usage data. For example, the quote server 112 may search the content 102 referenced in the usage data 116 to find the phrase "To promote." In some implementations, the comparison may be based at least in part on receiving the initiation event.

The comparison may include analyzing the content 102 to select one or more portions which match or otherwise correspond to the initiation data 120. For example, the initiation data 120 "to promote" matches a portion of the text for the United States Constitution which the user 104 had been accessing. The analyzing may also allow for near matches or incomplete phrases in the initiation data 120. For example, the initiation data 120 of "to promote progress" may be analyzed to determine a correspondence to the passage "to promote the Progress . . . "

Block 414 determines, based at least in part on a match found in the comparing or analyzing, the quote data 122. The quote data 122 comprises at least a portion of content 102 associated with the received initiation data 120. For example, the quote data 122 may include the entire sentence which begins "To promote . . . " The quote data 122 may have a default scope of the sentence, paragraph, and so forth. As described below, the user 104 may change the scope of the quote.

Block 416 provides the quote data 122 based at least in part on the determined portion of the content 102. For example, the quote server 112 may generate the quote data 122 including the quoted content 304 and may use the network 110 to send the quote data 122 to the second device 108.

Block 418 inserts the automatically generated quote 128 based at least in part on the quote data 122. For example, the quote module 114(2) of the second device 108 may process the quote data 122 and insert the placed quote 124 and the placed citation 126 into the body of the text being drafted by the user 104.

Block 420 accepts user input at the second device 108 to adjust a scope of the quoted material. For example, the user 104 may increase or decrease the selection of quoted material. Block 422 updates the determined portion of the content in the quote data 122 based on the user input, and provides this information to block 416. Block 416 may proceed to provide updated quote data 122 to the second device 108.

While the process 400 is depicted as occurring between the first device 106, the second device 108, and the quote server 112, in some implementations the functions described may be performed by additional or fewer devices. For example, the functions described may be provided by a single device.

Figure 5:
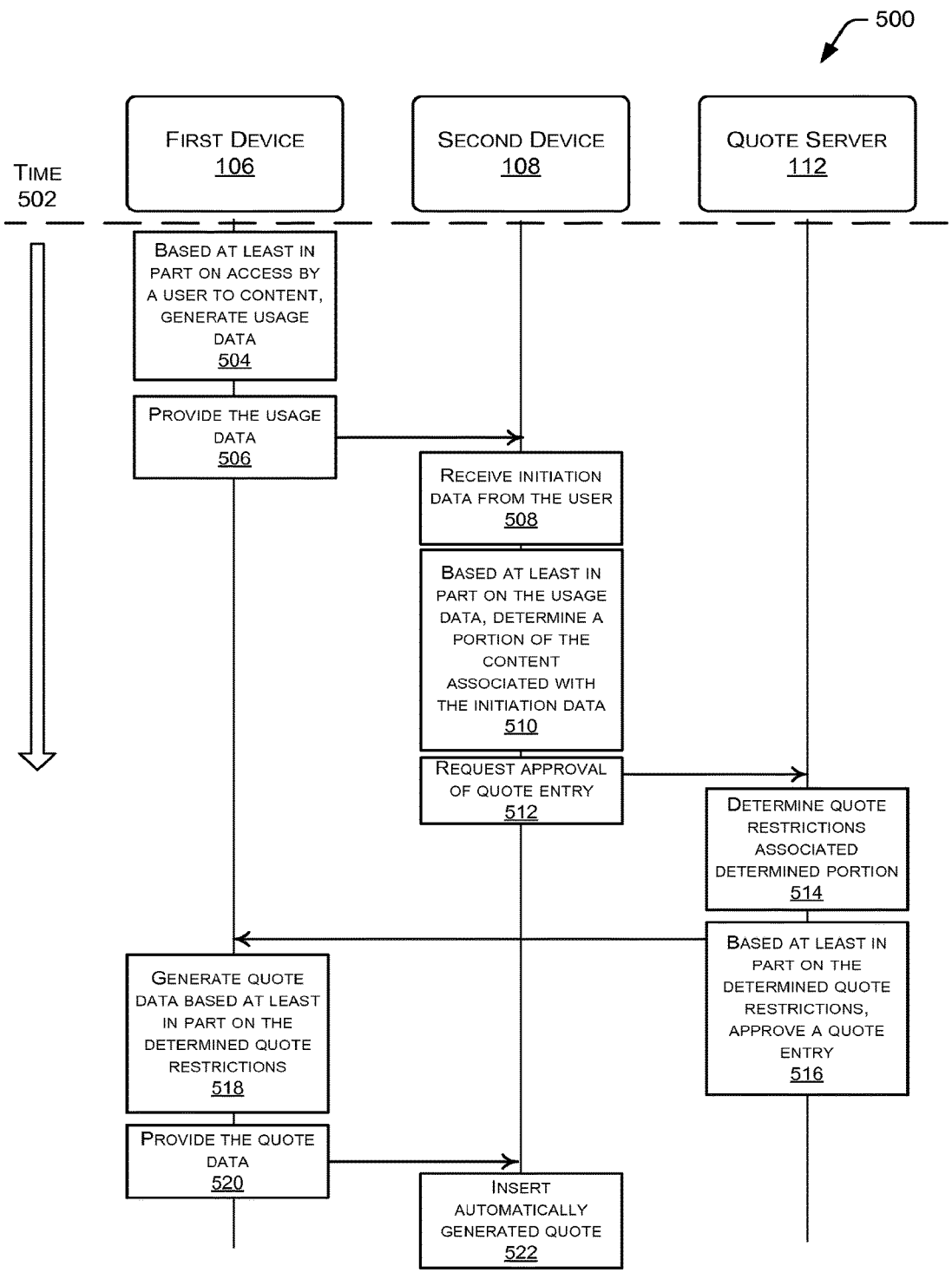
FIG. 5 illustrates a flow diagram of automatic generation of a quote in which the quote server approves a quote for placement.

FIG. 5 illustrates a flow diagram 500 of another implementation of automatic generation of a quote in which the quote server 112 approves a quote for placement. In some implementations, quote restrictions may be applied which limit the scope of a quote, quantity of quoted material, and so forth.

Similar to FIG. 4 above, this diagram depicts the first device 106, the second device 108, and the quote server 112. Time is indicated with arrow 502, with time increasing down the page. Based at least in part on access by the user 104 to content 102, block 504 generates usage data 116 associated with one or more pieces of content 102. Block 506 provides the usage data 116 to another device, such as the second device 108.

Block 508 receives a string input, such as an initiation data 120, from the user 104. For example, the user 104 may enter the start of a quote on the second device 108 while writing a term paper.

Block 510, based at least in part on the usage data 116, determines a portion of the content associated with the initiation data 120. For example, the quote module 114(2) may be configured to search the content 102 identified in the usage data 116 for the initiation data 120. The content 102 may be from a source other than the user 104, such as an eBook, or may comprise user-generated data, such as a user created document, email, graph, table, and so forth.

As described above, the usage data 116 may include one or more content identifiers 204. The content identifiers 204 may include a reference to an electronic piece of content 102, or may also reference physical content 102. For example, the content identifiers 204 may be an international standard book number, a universal product code, a title of published material, and so forth.

Block 512 requests approval of the quote entry. In some implementations, quote restrictions or other limitations may be placed on the user 104, the content 102, or a combination. For example, a teacher may have specified that the students are only allowed to quote a maximum of 1% of the source material. The quote restrictions are discussed below in more detail with regard to FIG. 8. In some implementations, approval of the quote may be omitted, or handled by the first device 106 or the second device 108.

Block 514 determines quote restrictions associated with the determined portion of the content 102. Based at least in part on the determined quote restrictions, block 516 approves a quote entry. For example, the quote server 112 may approve and send this approval to the first device 106 using the network 110.

Block 518 generates quote data 122 based at least in part on the determined quote restrictions, if any. Block 520 provides the quote data 122. For example, the first device 106 may send the quote data 122 to the second device 108. Block 522 inserts the automatically generated quote 128 based at least in part on the quote data 122. In some implementations, as described above with regard to FIG. 4, user input adjusting the scope of the quoted material may be accepted. This user input may be used to update the determined portion of the content, which in turn is used to provide updated quote data 122 which reflects this change in scope. While blocks 518 and 520 are depicted as operating on the first device 106, in other implementations the quote server 112 may provide these operations.

While the process 500 is depicted as occurring between the first device 106, the second device 108, and the quote server 112, in some implementations the functions described may be performed by additional or fewer devices. For example, the functions described may be provided by a single device.

Figure 6:
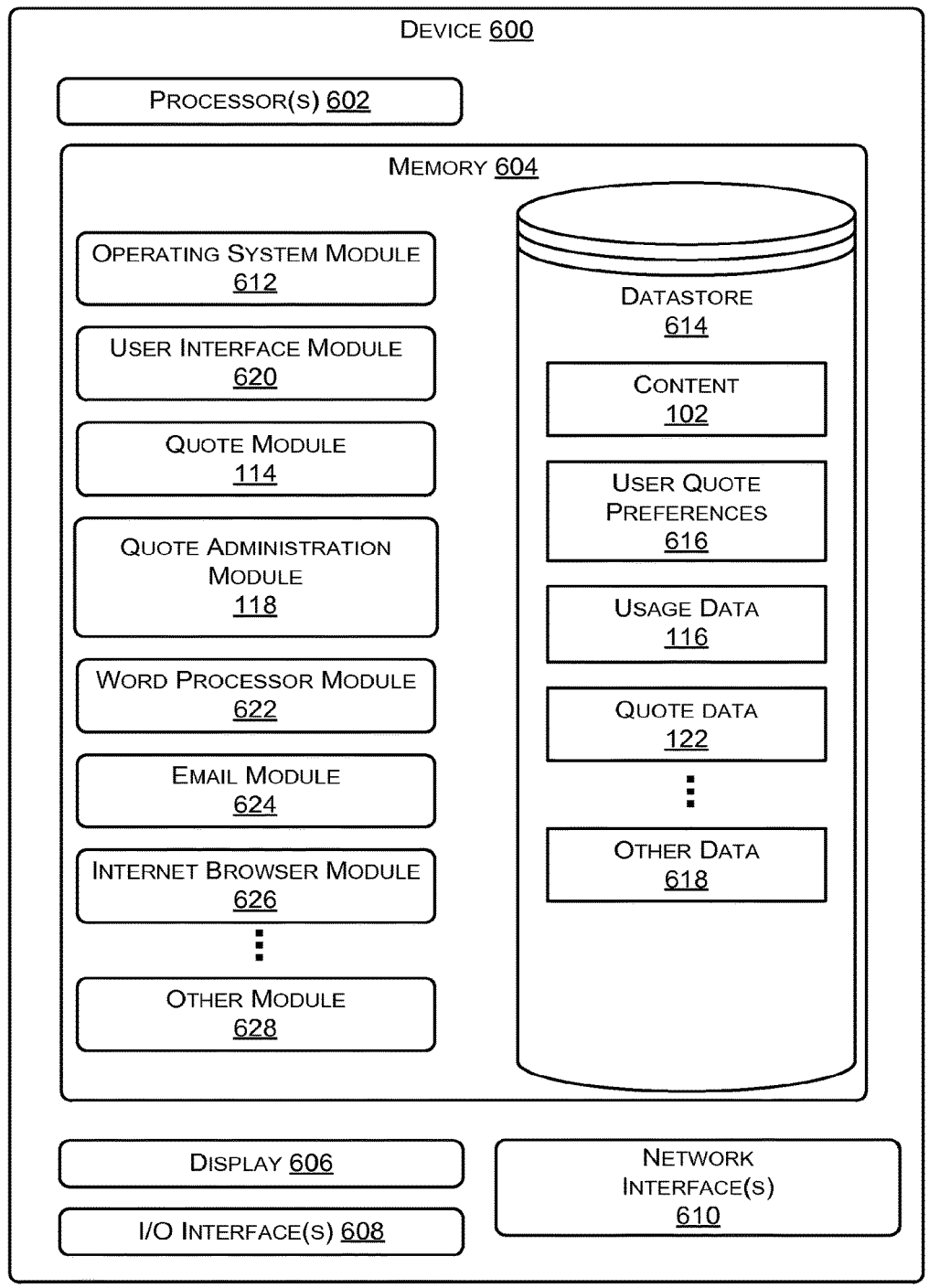
FIG. 6 illustrates a block diagram of a device such as the first device, the second device, or both configured to participate in automatic quote generation.

FIG. 6 illustrates a block diagram 600 of a device such as the first device 106, the second device 108, or both as configured to participate in automatic quote generation. The device 600 may comprise one or more processors 602, one or more memories 604, one or more displays 606, one or more input/output ("I/O") interfaces 608, and one or more network interfaces 610. The device 600 may include other devices not depicted.

The processor 602 may comprise one or more cores and is configured to access and execute at least in part instructions stored in the one or more memories 604. The one or more memories 604 comprise one or more computer-readable storage media ("CRSM"). The one or more memories 604 may include, but are not limited to, random access memory ("RAM"), flash RAM, magnetic media, optical media, and so forth. The one or more memories 604 may be volatile in that information is retained while providing power or non-volatile in that information is retained without providing power.

The display 606 is configured to present visual information to the user 104. The display 606 may comprise a reflective or emissive display configured to present images to the user 104. An emissive display emits light to form an image. Emissive displays include, but are not limited to, backlit liquid crystal displays, plasma displays, cathode ray tubes, light-emitting diodes, image projectors, and so forth. Reflective displays use incident light to form an image. This incident light may be provided by the sun, general illumination in the room, a reading light, and so forth. Reflective displays include, but are not limited to, electrophoretic displays, interferometric displays, cholesteric displays, and so forth. The display 606 may be configured to present images in monochrome, color, or both. In some implementations, the display 606 of the device 600 may use emissive, reflective, or combination displays with emissive and reflective elements.

The one or more I/O interfaces 608 may also be provided in the device 600. These I/O interfaces 608 allow for coupling devices such as keyboards, joysticks, touch sensors, cameras, microphones, speakers, haptic output devices, external memories, and so forth to the device 600.

The one or more network interfaces 610 provide for the transfer of data between the device 600 and another device directly such as in a peer-to-peer fashion, via the network 110, or both. The network interfaces 610 may include, but are not limited to, personal area networks ("PANs"), wired local area networks ("LANs"), wireless local area networks ("WLANs"), wireless wide area networks ("WWANs"), and so forth. The network interfaces 610 may utilize acoustic, radio frequency, optical, or other signals to exchange data between the device 600 and another device such as an access point, a host computer, another device 600, and the like.

The one or more memories 604 may store instructions or modules for execution by the processor 602 to perform certain actions or functions. The following modules are included by way of illustration, and not as a limitation. Furthermore, while the modules are depicted as stored in the memory 604, in some implementations, these modules may be stored at least in part in external memory, such as in the quote server 112 which is accessible to the device 600 via the network 110. These modules may include an operating system module 612 configured to manage hardware resources such as the I/O interfaces 608 and provide various services to applications or modules executing on the processor 602.

The one or more memories 604 may also store a datastore 614. The datastore 614 may comprise one or more databases, files, linked lists, or other data structures. The datastore 614 may be configured to store content 102, user quote preferences 616, usage data 116, quote data 122, or other data 618. The user quote preferences 616 may define particular citation styles, formatting, and so forth which the user 104 prefers to see.

A user interface module 620 is configured to provide a user interface which handles inputs from and outputs to the user 104 during operation of the device 600. For example, the user interface module 620 may be configured to present a portion of the content 102, or accept the user's initiation data 120 during the creation of new content or the modification of existing content. User input may include key presses, touches on a touch screen, movement of the device 600 or a portion thereof, speech input, gestures, images acquired by a camera, and so forth. User outputs may include presentation on the display 606, sound from a speaker, haptic output generating a physical sensation or the appearance of a physical sensation, and so forth.

The quote module 114, as described above, is configured to provide automatically generated quote 128 functionality to the user 104. The quote module 114 may be configured to work in conjunction with other modules such as those described next which may receive the automatically generated quotes 128.

In some implementations the device 600 may include the quote administration module 118. As described above, the quote administration module 118 may be configured to enforce quote restrictions, determine quotes, distribute quotes, and so forth. The quote administration module 118 may work in conjunction with one or more of the quote modules 114.

A word processor module 622 is configured to allow the user 104 to edit or create documents. An email module 624 is configured to provide messaging functionality. An internet browser module 626 is configured to render information provided in markup languages including hypertext markup language ("HTML"). The quote module 114 may work in conjunction with these modules to allow for the insertion of the automatically generated quotes 128. Other modules 628 may be present, such as digital rights management modules, graphic editing modules, and so forth.

Figure 7:
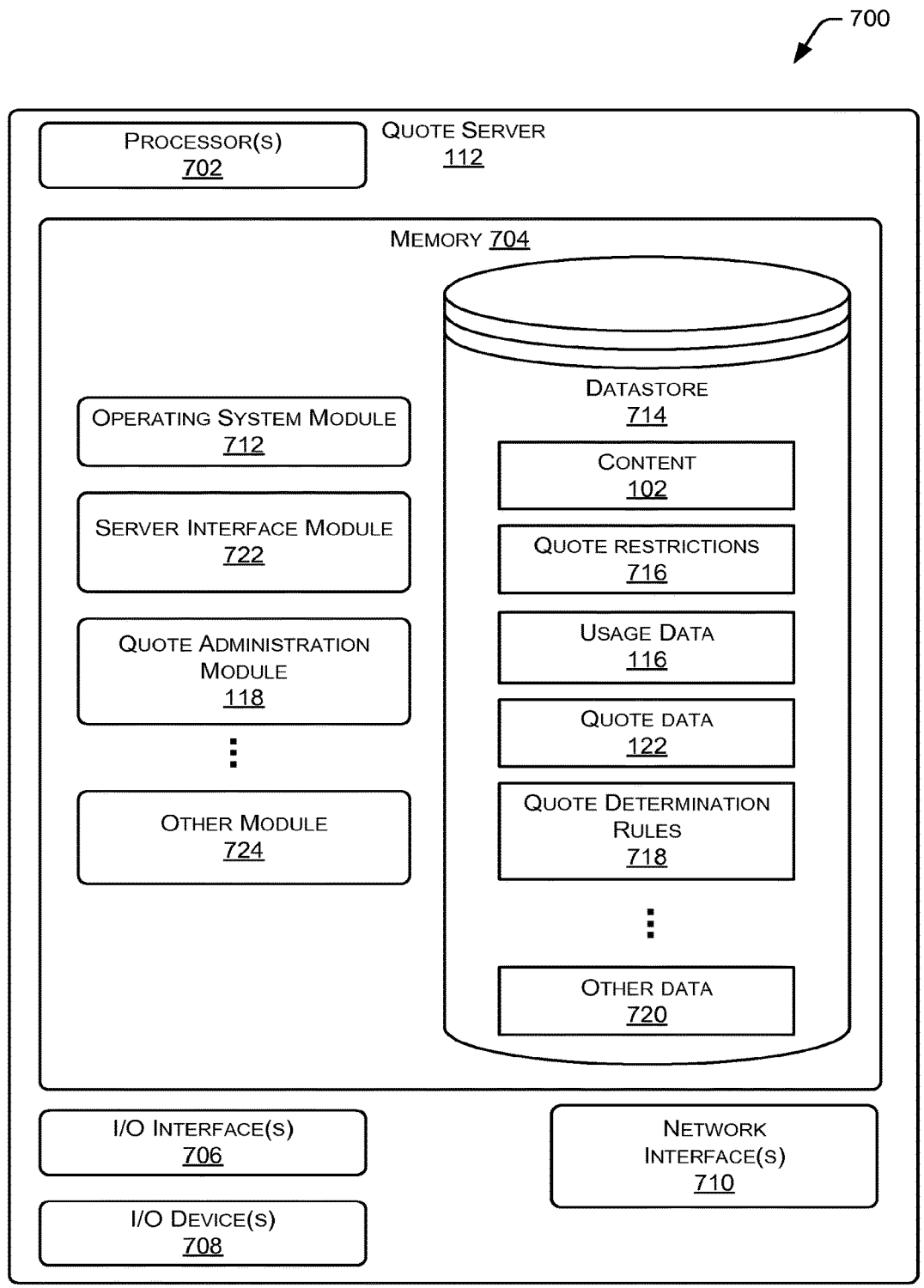
FIG. 7 illustrates a block diagram of the quote server configured to provide automatic quotes.

FIG. 7 illustrates a block diagram 700 of the quote server 112 configured to provide automatically generated quotes 128. The quote server 112 may comprise one or more processors 702, one or more memories 704, one or more input/output ("I/O") interfaces 706, one or more I/O devices 708, and one or more network interfaces 710. The quote server 112 may include other devices not depicted.

The processor 702 may comprise one or more cores and is configured to access and execute at least in part instructions stored in the one or more memories 704. The one or more memories 704 comprise CRSM. The one or more memories 704 may include, but are not limited to, random access memory ("RAM"), flash RAM, magnetic media, optical media, and so forth. The one or more memories 704 may be volatile in that information is retained while providing power or non-volatile in that information is retained without providing power.

The one or more I/O interfaces 706 may also be provided in the quote server 112. These I/O interfaces 706 allow for coupling the I/O devices 708 such as keyboards, displays, touch sensors, external memories, cryptographic processors, and so forth to the quote server 112.

The one or more network interfaces 710 provide for the transfer of data between the quote server 112 and another device directly such as in a peer-to-peer fashion, via the network 110, or both. The network interfaces 710 may include, but are not limited to, PANs, LANs, WLANs, WWANs, and so forth. The network interfaces 710 may utilize acoustic, radio frequency, optical, or other signals to exchange data between the quote server 112 and another device such as router, network switch, another quote server 112, the first user device 106, or the second user device 108, and the like.

The one or more memories 704 may store instructions or modules for execution by the processor 702 to perform certain actions or functions. The following modules are included by way of illustration, and not as a limitation. Furthermore, while the modules are depicted as stored in the memory 704, in some implementations, these modules may be stored at least in part in external memory, such as in other devices which are accessible to the quote server 112 via the network 110. These modules may include an operating system module 712 configured to manage hardware resources such as the I/O interfaces 706 and provide various services to applications or modules executing on the processor 702.

The one or more memories 704 may also store a datastore 714. The datastore 714 may comprise one or more databases, files, linked lists, or other data structures. The datastore 714 may be configured to store content 102, quote restrictions 716, usage data 116, quote data 122, quote determination rules 718, or other data 720. The quote restrictions 716 define what may be quoted and how much of the content 102 may be included in the quote. The quote restrictions 716 are discussed in more detail below with regard to FIG. 8.

A server interface module 722 is configured to provide a user interface, application interface, or both, which handles inputs and outputs from the user 104 during operation of the quote server 112. For example, the server interface module 722 may be configured to provide an application programming interface which the quote modules 114 may use to access the quote server 112.

The quote administration module 118 may be configured to enforce quote restrictions 716, determine quotes, distribute quotes, and so forth. The quote administration module 118 may work in conjunction with one or more of the quote modules 114 to automatically generate quotes. For example, the quote administration module 118 may receive via the server interface module 722 the usage data 116 and the initiation data 120. Based at least in part on this data, the quote administration module 118 may generate the quote data 122 and provide it to a recipient device, such as the second device 108.

The quote administration module 118 may be configured to apply spell checking, machine learning, heuristics, and so forth to determine a portion of the content 102 for quotation where the user 104 has incorrectly entered a quote. For example, the initiation data 120 may be incorrectly entered as "To encourage and promote" which the quote module 114 in conjunction with the quote administration module 118 determines the user 104 likely intended to enter "To promote" based at least in part on the usage data 116 and the data in the recently accessed content 102.

Other modules 724 may be present in the memory 704 as well. For example, a content indexing module may be present and configured to generate one or more indices for finding content.

Figure 8:
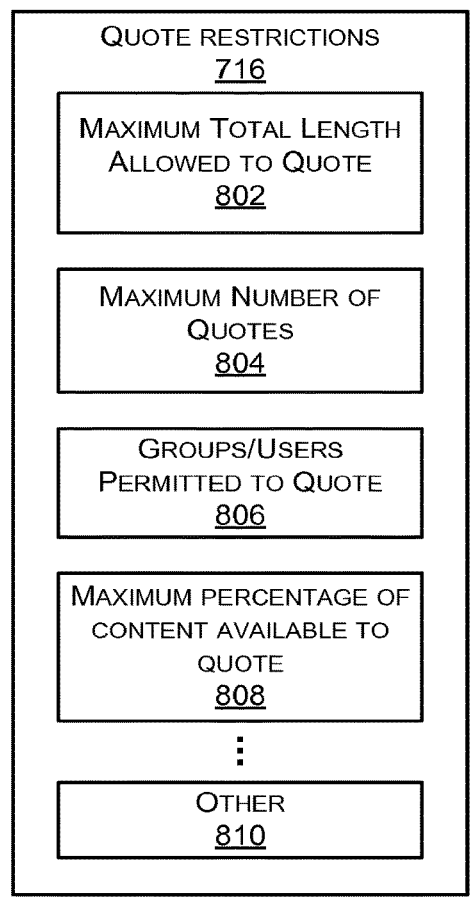
FIG. 8 illustrates a block diagram of quote restrictions which may be used to control automatic quote generation.

FIG. 8 illustrates a block diagram 800 of quote restrictions 716 which may be used to control automatic quote generation. The quote module 114, the quote administration module 118, or both may use the quote restrictions 716 to control when and how the automatically generated quote 128 is provided.

The quote restrictions 716 may include a maximum total length allowed to quote 802. This may indicate a maximum for an individual quote, maximum of cumulative quoted material, and so forth. For example, a publisher may set the maximum total length allowed to quote 802 to 1000 characters per quotation. Users 104 may insert automatically generated quotes up to this 1000 character limit, but longer quotes would be disallowed.

A maximum number of quotes 804 may also be specified. For example, the publisher may further set that no more than fifteen quotes, regardless of length, may be made from the content 102.

Particular groups or users may be permitted or disallowed to quote 806. For example, university students may be permitted to quote the content 102, or may have different quote restrictions, compared to non-students.

A maximum percentage of content available to quote 808 may be specified. For example, the author may specify that no more than 5% of the content 102 may be quoted. Other 810 restrictions may also be provided. In some implementations, the quote restrictions 716 may be applied to a particular portion of the content 102. For example, a portion of an eBook where the denouement takes place may be restricted such that quotes are not permitted.

Figure 9:
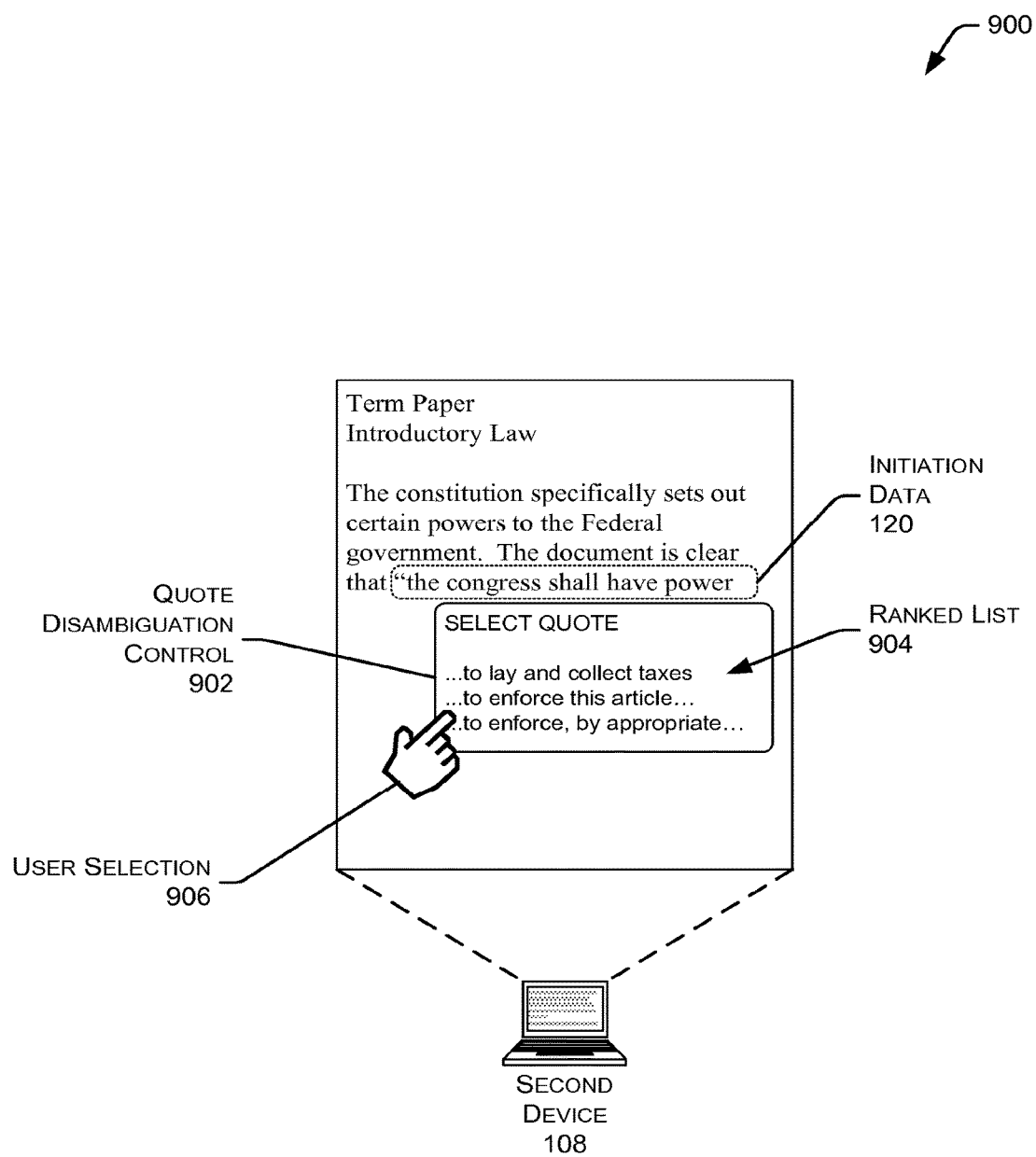
FIG. 9 illustrates a user interface in which the user is prompted to resolve an ambiguity in the source of the quote.

FIG. 9 illustrates a user interface 900 in which the user 104 is prompted to resolve an ambiguity in the source of the quote. As described above, the user 104 may enter an initiation data 120 or other data to begin the quotation process. Occasionally some ambiguity may occur where the initiation data 120 is present in multiple locations within the same piece of content 102, or across several pieces of content 102. The quote module 114 and the quote administration module 118 may be configured to use the usage data 116 to disambiguate the results, however, occasionally the determination of the portion of the content 102 to be quoted may be completed with the assistance of the user 104.

In this illustration, the user 104 has been typing a term paper using a word processor module 622 on the second device 108. The user 104 has entered the initiation data 120 of "the congress shall have power." After processing this initiation data 120 and determining that a plurality of possible quotes are available, the quote module 114(2) may present a quote disambiguation control 902. The quote disambiguation control 902 is configured to allow the user 104 to specify a particular piece of content 102 or portion thereof for selection. In some implementations where many different pieces of content 102 are implicated, the quote disambiguation control 902 may use a hierarchical presentation format, such as presenting titles, then allowing the user 104 to progressively select down to a particular chapter, then passage.

The quote disambiguation control 902 may be configured to present a ranked list 904. The ranked list 904 may be sorted or ranked based at least in part on the usage data 116. For example, the list may be sorted by the date/time last accessed 208, dwell time 210, and so forth. A plurality of different factors may be used and weighted to develop the ranking. For example, the date/time 208 may be given more weight than the dwell time 210.

The user may make a user selection 906 of the particular quote. Once selection is made, the quote module 114(2) may be configured to complete generation of the automatically generated quote 128. As described above, the user interface may be configured to allow the user 104 to change the scope of the quote, changing the beginning or end of the quote.

In some implementations, the user 106 may disambiguate from several possible quotes by continuing to type text. The additional data in the initiation data 120 may thus be used to reduce potential quotes on the ranked list 904, or to disambiguate sufficiently that a single quote is selected.

Figure 10:
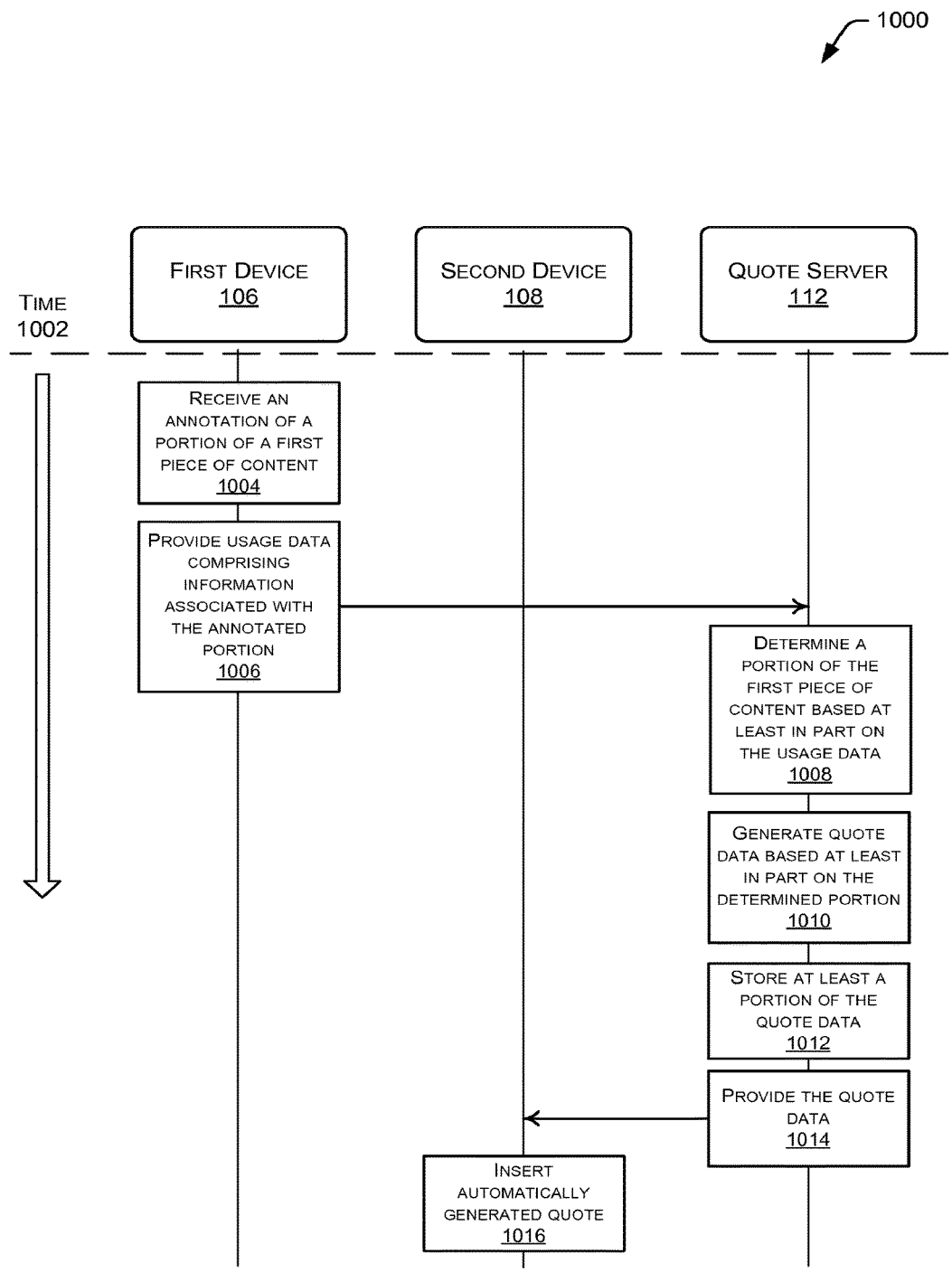
FIG. 10 illustrates a flow diagram of receiving a user annotation such as a comment or highlight and generating a quote.

FIG. 10 illustrates a flow diagram 1000 of receiving a user annotation such as a comment or highlight and generating a quote based at least in part on that annotation. This diagram depicts the first device 106, the second device 108, and the quote server 112. Time is indicated with arrow 1002, with time increasing down the page.

Block 1004 receives an annotation of a portion of the content 102. For example, the user 104 may use the first device 106 to enter a highlight of a passage in the content 102.

Block 1006 provides usage data 116 comprising information associated with the annotated portion. For example, the first device 106 may send the usage data 116 to the quote server 112 using the network 110.

Block 1008 determines a portion of the content 102 for quotation, based at least in part on the usage data 116. For example, the quote server 112 access the referenced content 102 using the content identifier 204 and the annotation entered 210 data.

Block 1010 generates quote data 122 based at least in part on the determined portion. Because the user 104 has interacted with a particular annotation, and that annotation is associated with a particular portion of the content, disambiguation may not be called for.

Block 1012 stores at least a portion of the quote data 122. For example, the quote server 112 may transfer at least a portion of the quote data 122 to the second device 108. The quote module 114(2) of the second device 108 may then generate the automatically generated quote 128 based at least in part on the quote data 122.

Block 1014 provides the quote data 122. For example, the first device 106 may send the quote data 122 to the second device 108. Block 1016 inserts the automatically generated quote 128 based at least in part on the quote data 122. In some implementations, as described above with regard to FIG. 4, user input adjusting the scope of the quoted material may be accepted. This user input may be used to update the determined portion of the content, which in turn is used to provide updated quote data 122 which reflects this change in scope.

While the process 1000 is depicted as occurring between the first device 106, the second device 108, and the quote server 112, in some implementations the functions described may be performed by additional or fewer devices. For example, the functions described may be provided by a single device.

Figure 11:
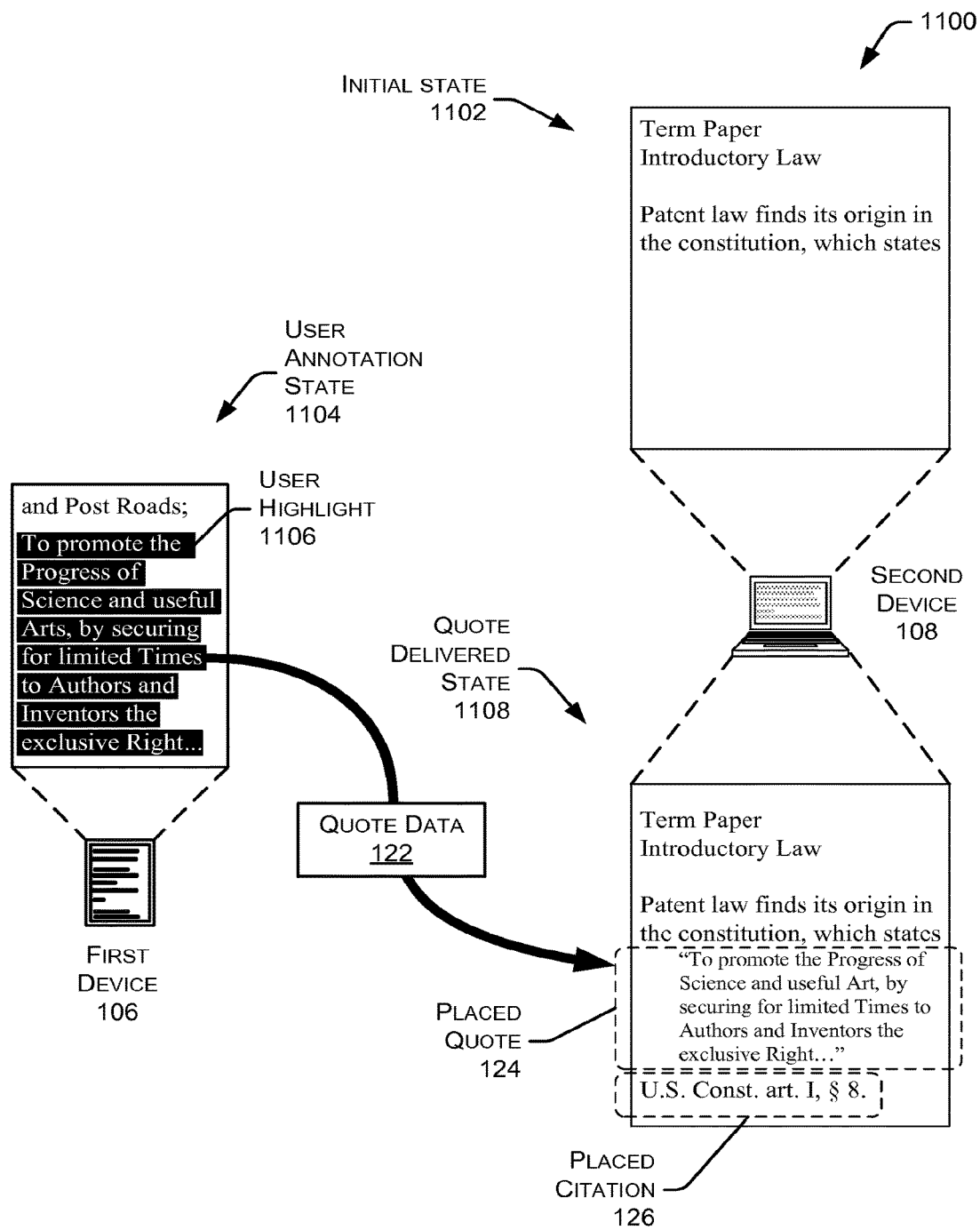
FIG. 11 illustrates an exemplary user interface presented to generate a quote at least partly in response to the user annotation.

FIG. 11 illustrates a user interface 1100 presented to generate an automatically generated quote 128 at least partly in response to the user annotation. An initial state 1102 is depicted where the user 104 is drafting a term paper using the word processor module 622 of the second device 108. Contemporaneously, the user 104 is also accessing the first device 106 which is currently presenting a page of content 102.

As shown in the user annotation state 1104, the user 104 has entered a user highlight 1106 of a portion of the content. In response to the entry of the highlight, or in response to a query from another device such as the second device 108 or the quote server 112, the quote data 122 is provided. The quote data 122 may be provided directly to the second device 108, or may be provided to the quote server 112.

Initiation of the quote process may be automatic or triggered by an action of the user 104. For example, the user 104 may configure the first device 106 automatically send a quote for all highlights. Or the user 104 may highlight and press a hotkey which sends the quote data 122 to initiate the automatically generated quote 128.

A quote delivered state 1108 depicts the second device 108 after generation of the automatically generated quote 128. Once the quote data 122 has been processed, quote restrictions 716 have been checked and cleared, and so forth, the quote data 122 is processed by the quote module 114(2) to generate the placed quote 124 and the placed citation 126.

In some implementations, quote data 122 may be presented in a user interface as a list of available quotes. The user 104 may then select from this list to insert the automatically generated quotes 128 at a later time. For example, while reading the content 102, the user 104 may make many highlights or other annotations. Later, in front of the second device 108 and preparing to write the term paper, the user 104 may call up a listing of the pending quotations based on the quote data 122 from the first device 106. During composition of the term paper, the user 104 may then select a particular quote to have it inserted at a particular point in the paper.

Figure 12:
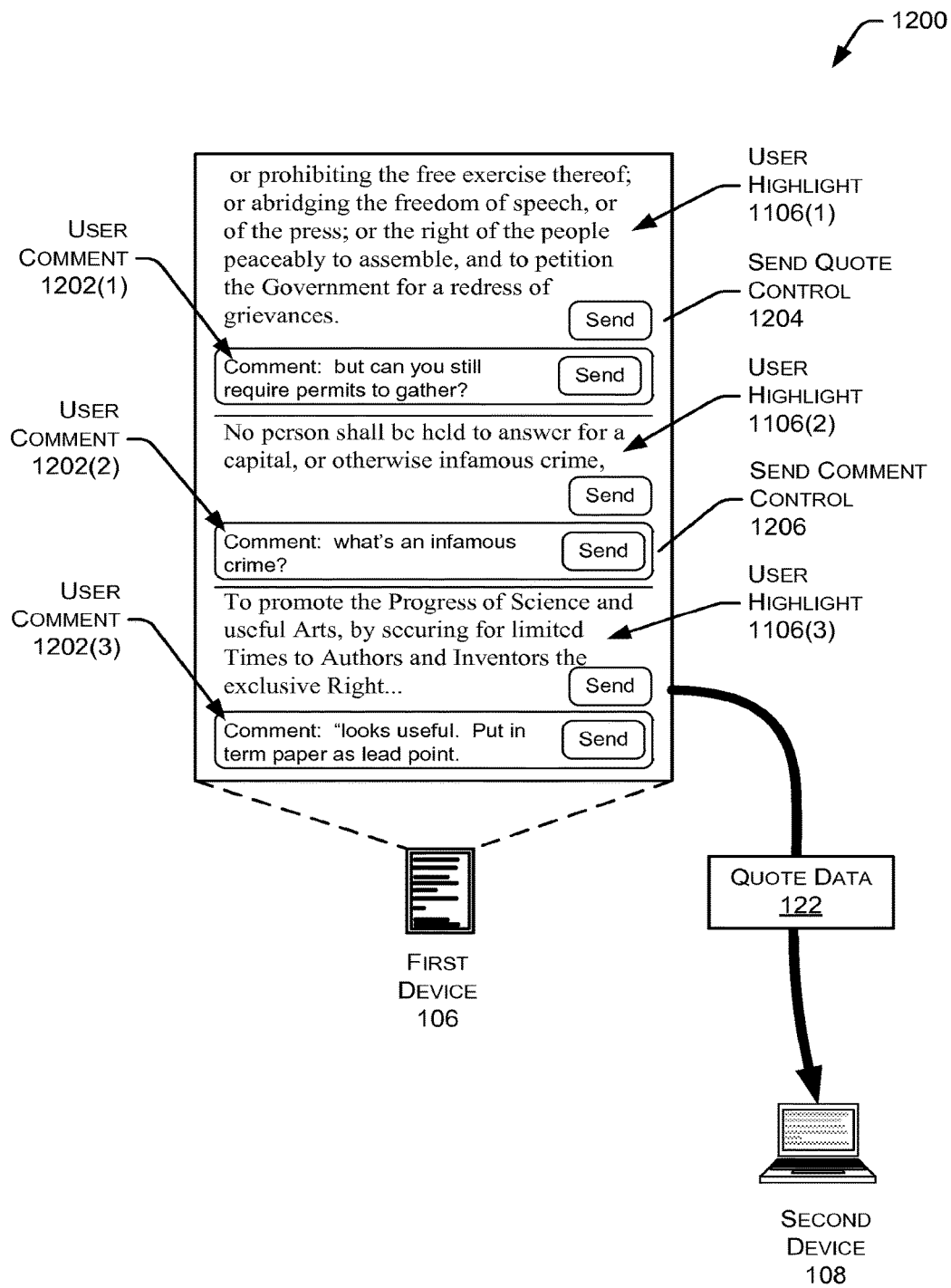
FIG. 12 illustrates an exemplary user interface presented to generate a quote from an existing user annotation.

FIG. 12 illustrates an exemplary user interface 1200 presented to generate a quote from one or more existing user annotations. In this illustration, the user interface 1200 depicts the text associated with several of the user highlights 1106 as presented on the first device 106. Also depicted are user comments 1202. For example, the user 104 may have highlighted a portion of the text and added additional information describing the highlighted portion.

A send quote control 1204 may be provided in the user interface 1200. The user 104 may activate this control to instruct the quote module 114 to send the quote data 122 comprising the user highlight 1106 to another device, such as the second device 108 or the quote server 112. On another device, such as the second user device 122, the same or another user 104 may select one or more of the quotes for insertion into another document.

A send comment control 1206 may be provided in the user interface 1200. Similar to the send quote control 1204, the user 104 may activate the send comment control 1206 to instruct the quote module 114 send the quote data 122 comprising the user comment 1202 to another device.

As described above, the user 104 may enter an initiation data 120 which includes text present in the user comment 1202. For example, the user 104 may enter as the initiation data 120 at least a portion of the text in the user comment 1202(2) on the second device 108 which would result in the quote module 114(2) inserting the associated content 102 designated by the user highlight 1106(2). Alternatively, the user 104 may select or indicate that the user comment 1202 is to be quoted or inserted.

By providing the ability to quickly and accurately insert quotations into the material the overall user experience is improved for the user 104 and for the consumer of the content generated by the user 104. Furthermore, the quote restrictions and other digital rights management controls may be useful in mitigating problems such as plagiarism.

CONCLUSION

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A computer-implemented method comprising:
   receiving, by one or more computer processors coupled to memory, first data associated with first content, wherein the first data includes a content identifier of the first content;
   receiving second data from a user interface component, the second data associated with a user input in a user-created document, wherein the second data comprises a selection of a first portion of the first content;
   determining the first portion of the first content that is associated with the second data;
   automatically generating text based at least in part on the first data and the second data, the text comprising the first portion of the first content and a second portion of the first content that follows the first portion of the first content, wherein the second portion is identified based at least in part on a number of words that follow the first portion;
   causing presentation of at least a portion of the text for acceptance prior to inserting the text into second content;
   inserting the text into the second content;
   causing presentation of the text and the second content at a first device;
   determining words inserted from at least one of an electronic book source or a website source; and
   generating bibliographical data identifying the electronic book source or the website source.

2. The computer-implemented method of claim 1, wherein the content identifier is at least one of a unique content identifier, a universal product code, or a title of published material.

3. The computer-implemented method of claim 1, wherein receiving the second data comprises receiving a set of locations within an electronic book.

4. The computer-implemented method of claim 1, wherein inserting the text into the second content comprises inserting the words and the bibliographical data into the second content.

5. The computer-implemented method of claim 1, wherein receiving the first data comprises receiving the first data from the first device; and
wherein receiving the second data comprises receiving the second data from a second device with the user interface component.

6. The computer-implemented method of claim 1, wherein the first content comprises one or more electronic books and the first data is received from a device configured to present the one or more electronic books.

7. The computer-implemented method of claim 1, wherein the first data comprises one or more of: a user account identifier, a location in content presented, a dwell time at the location, an annotation entered, or an annotation reviewed.

8. The method of claim 1, wherein the text is generated based at least in part on a database of user-selected annotations to the reading material.

9. A device comprising:
at least one memory that stores computer-executable instructions; and
at least one processor configured to access the at least one memory and execute the computer-executable instructions to:
receive first data associated with first content in a message thread from a first device;
receive second data from a user interface component at a second device, the second data associated with a user input in a user-created document, wherein the second data comprises a selection of a first portion of the first content;
determine a first portion of the first content that is associated with the second data;
automatically generate text based at least in part on the first data and the second data, the text comprising the first portion of the first content and a second portion of the first content that follows the first portion of the first content, wherein the second portion is identified based at least in part on a number of words that follow the first portion;
cause presentation of at least a portion of the text for acceptance prior to inserting the text into second content;
insert the text into the second content;
cause presentation of the second content and the text in the message thread;
determine words inserted from at least one of an electronic book source or a website source; and
generate bibliographical data identifying the electronic book source or the website source.

10. The device of claim 9, wherein the first data comprises at least one of a unique content identifier, a universal product code, or a title of published material.

11. The device of claim 9, wherein the at least one processor is configured to receive the second data by executing the computer-executable instructions to receive a set of locations within an electronic book.

12. The device of claim 9, wherein the at least one processor is configured to insert the text into the second content by executing the computer-executable instructions to insert the words and the bibliographical data into the second content.

13. The device of claim 9, wherein the first content comprises one or more electronic books and the first data is received from a device configured to present the one or more electronic books.

14. The device of claim 9, wherein the first data comprises one or more of: a user account identifier, a location in content presented, a dwell time at the location, an annotation entered, or an annotation reviewed.

15. The device of claim 9, wherein the text is generated based at least in part on a database of user-selected annotations to the reading material.

* * * * *